No. 615,631. Patented Dec. 6, 1898.
M. B. NAIRN.
MACHINERY FOR MANUFACTURING LINOLEUM.
(Application filed Jan. 24, 1898.)
(No Model.) 4 Sheets—Sheet 1.
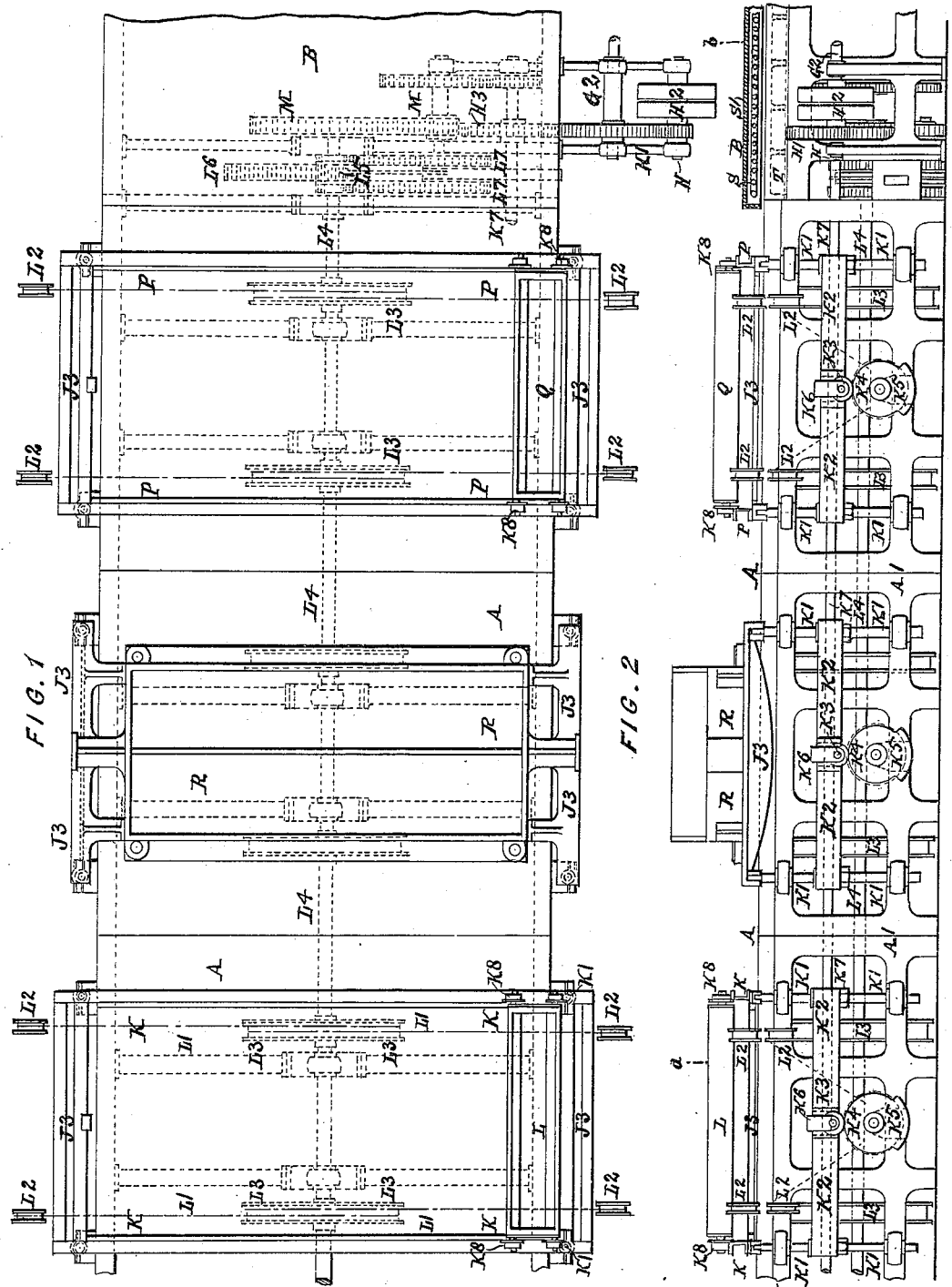
WITNESSES:
INVENTOR
MICHAEL B. NAIRN
BY
Howson and Howson
HIS ATTORNEYS.

No. 615,631. Patented Dec. 6, 1898.
M. B. NAIRN.
MACHINERY FOR MANUFACTURING LINOLEUM.
(Application filed Jan. 24, 1898.)
(No Model.) 4 Sheets—Sheet 2.

WITNESSES:
J. W. Wright.
J. L. Connor

INVENTOR
MICHAEL B. NAIRN
BY
Howson and Howson
HIS ATTORNEYS.

No. 615,631. Patented Dec. 6, 1898.
M. B. NAIRN.
MACHINERY FOR MANUFACTURING LINOLEUM.
(Application filed Jan. 24, 1898.)

(No Model.) 4 Sheets—Sheet 3.

WITNESSES:
F. W. Wright.
S. C. Connor

INVENTOR
MICHAEL B NAIRN
BY
Howson and Howson
HIS ATTORNEYS.

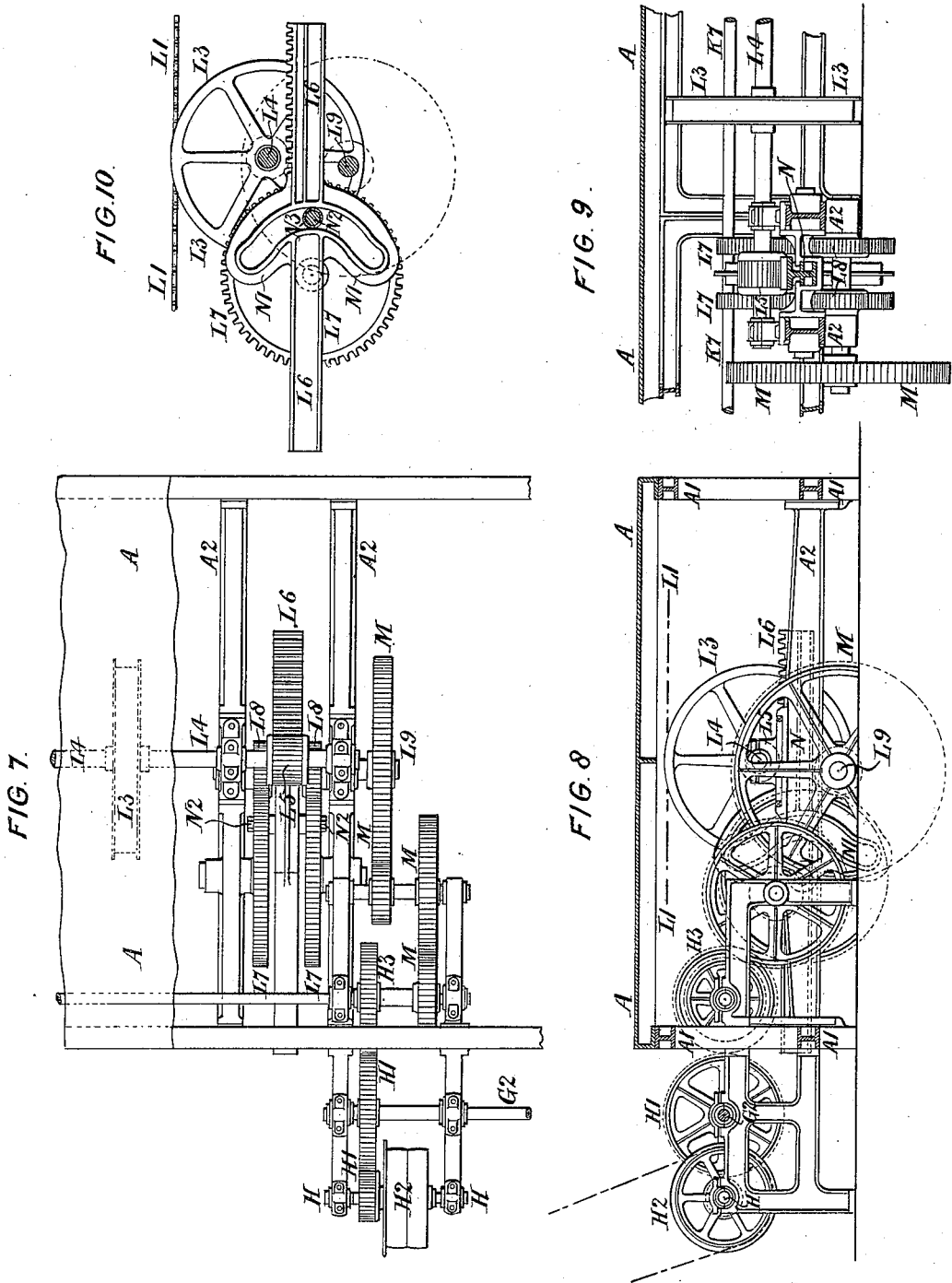

UNITED STATES PATENT OFFICE.

MICHAEL BARKER NAIRN, OF DYSART, SCOTLAND.

MACHINERY FOR MANUFACTURING LINOLEUM.

SPECIFICATION forming part of Letters Patent No. 615,631, dated December 6, 1898.

Application filed January 24, 1898. Serial No. 667,762. (No model.)

*To all whom it may concern:*

Be it known that I, MICHAEL BARKER NAIRN, a subject of the Queen of Great Britain and Ireland, and a resident of Dysart, in the county of Fife, Scotland, have invented certain Improvements in Machinery for Manufacturing Linoleum, of which the following is a specification.

My said invention has for its object the making of linoleum floor-cloth in an improved manner and by means of improved machinery admitting of the attainment of improved ornamental effects.

In carrying out my invention the linoleum material in a loose granular condition is applied to a backing of a woven or other suitable fabric through stencil-plates perforated to produce a pattern and fixed to frames, so as to form what are hereinafter termed "stencil-trays." The backing, with the granular linoleum on it, is passed through a heating-chamber to soften the linoleum and render it coherent and is next subjected to considerable pressure to consolidate it and render it dense and even.

In order that my said invention and the manner of performing the same may be properly understood, I hereunto append four sheets of explanatory drawings, to be hereinafter referred to, and showing machinery for the manufacture of linoleum floor-cloth as made with my improvements.

Figures 3, 4:
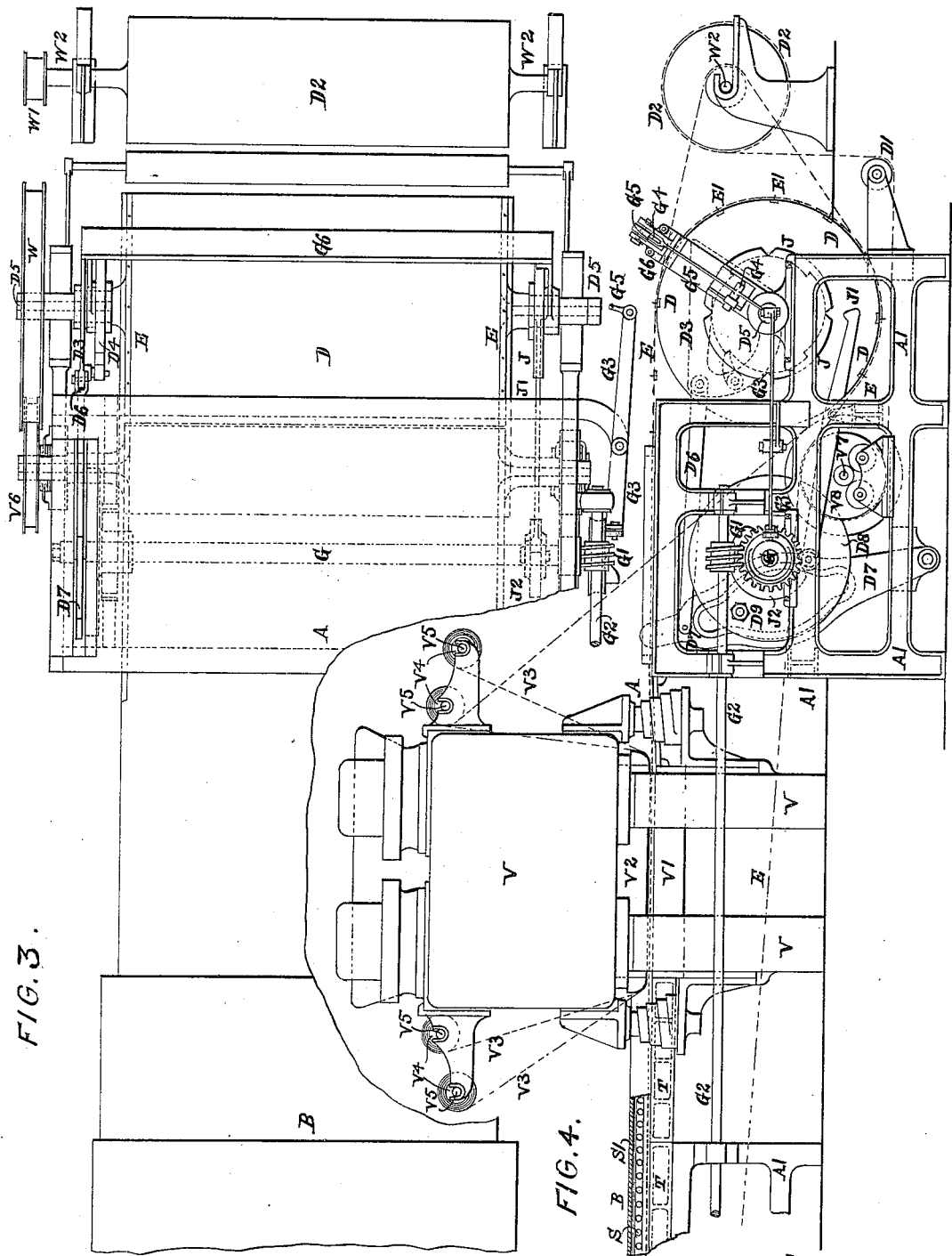
Figure 5:
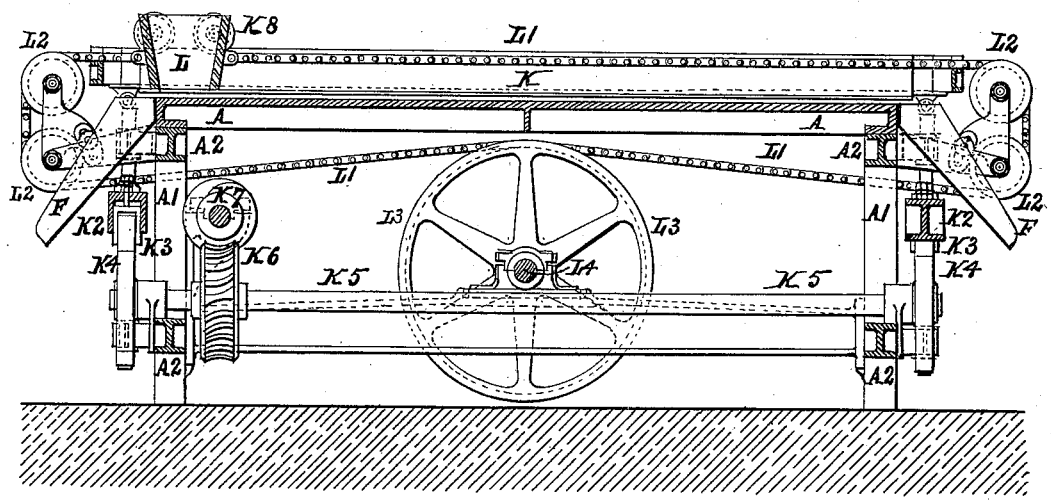
Figure 6:
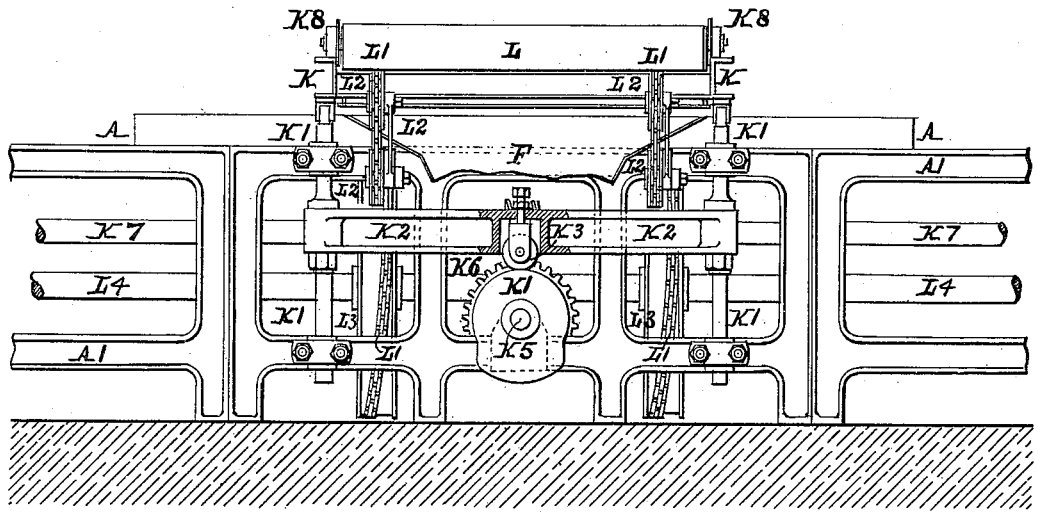

Figures 1 and 2 on Sheet 1 of the drawings are respectively a plan and an elevation of a part of the improved machinery. Figs. 3 and 4 on Sheet 2 are respectively a plan and an elevation of a part of the improved machinery not appearing in Figs. 1 and 2. Fig. 5 on Sheet 3 is a transverse vertical section of the machinery as taken at a line $a$ in Fig. 2, and Fig. 6 is a sectional side elevation of the part of the machinery shown in Fig. 5. Figs. 7 and 8 on Sheet 4 are respectively a sectional plan and a transverse vertical section of part of the machinery, the section being taken as at a line $b$ in Fig. 2. Fig. 9 is a longitudinal vertical section of the part shown in Fig. 8. Fig. 10 is a sectional elevation of a detail.

In the drawings the same reference-letters are used to mark the same or like parts wherever they are repeated.

The machine may be constructed for any convenient number of different colors; but, assuming it to be made for six main or body colors, for example, it is provided with six separate stencil-trays for those colors, together with six sets of the parts acting with the trays. Only one, K, of the stencil-trays for the main or body colors is shown in the drawings; but the actual machine extends from what is shown in the drawings toward the left hand, and the stencil-trays, with their accessories, which are not shown, are repetitions exactly like the tray K and its accessories, which are shown.

The machinery comprises a long table A, supported by parallel side frames A', connected by cross-girders A², the framing also carrying shafting and gearing for moving the various parts. The backing fabric is drawn in an ordinary way off a roller at the left-hand or entering end of the machine and passes along the table A, thence through a heating-chamber B, and through pressing apparatus V to a take-up cylinder D, from which it proceeds around guide-rollers V⁸ and D'. to a terminal roller D², on which it is wound up. The fabric is assisted in its movements and is kept even and without distortion by endless steel bands E, which engage with its edges by means of sharp pins E'. The endless steel bands E extend throughout the whole length of the machine, passing around the take-up cylinder D and being guided at other parts by pulleys, wheels, or rollers. (Not shown.) The movement of the fabric is intermittent, the take-up cylinder D being turned to a suitable extent at the proper times by a pawl-lever D³, acting on a ratchet-wheel D⁴, fast on the shaft D⁵, on which the take-up cylinder is fixed. The pawl-lever D³, Fig. 4, is in the form of a bell-crank, which is centered loosely on the shaft D⁵ and is connected by a link D⁶ to the upper end of a lever D⁷, which is centered at its lower end to the machine-framing A'. The lever D⁷ is actuated by a disk D⁸, armed with a projecting pin D⁹ to work in a cam-shaped slot in the lever, and this disk is fast on a shaft G, which is driven through worm and worm-wheel gearing G' by a shaft G², driven through spur-wheels H' by a first-motion shaft H, driven by means of pulleys H² and belting. The worm-wheel G' on the shaft G is formed with a cam-face which as the shaft revolves acts on a lever $G^3$, which, through bell-cranks $G^4$, links $G^5$, and eccentrics, (not shown in Fig. 3,) actuates a clamp or gripper $G^6$, which when the fabric is being moved binds it, and, if necessary, its steel side bands E, firmly upon the take-up cylinder D, so that the cylinder cannot slip around without taking the fabric with it. A register-wheel J is provided to bring about an accurate stoppage of the take-up cylinder D, this wheel being fast on the cylinder-shaft $D^5$ and being formed with notches in which engage the angular end of a lever J', actuated by a cam $J^2$ on the shaft G.

The fabric is stationary while the linoleum material is being applied, and there are as many stencil-plates as there are colors of linoleum to form the pattern, the stencil-plates being fixed to the bottoms of frames K, so as to form a kind of tray. The stencil-trays are placed at such distances apart along the machine that the fabric has to make two forward movements to move each successive part of the fabric from under one tray to the next one, and each tray is held by frame-bars $J^3$, attached to guided vertical rods K', which are connected at each side by horizontal bars $K^2$, each bar being provided at its middle part with a roller $K^3$, capable of vertical adjustment and which is acted on by a cam $K^4$ on a shaft $K^5$, driven through worm and worm-wheel gearing $K^6$ by a shaft $K^7$, driven through spur-wheels $H^3$ and H' by the first-motion shaft H. The vertical rods K' lift each stencil-tray while the fabric moves and lower it while the fabric is stationary. The granular linoleum material is supplied by hand to open-bottomed troughs L, which at their ends are fitted with small wheels $K^8$ to run on the frame-bars $J^3$ of the trays. Each trough L moves within its tray, its bottom being in contact, or nearly so, with the stencil-plate, and at each operation while the fabric is stationary below each trough moves over the stencil-plate and back again, the movement of the trough being transverse. To effect the movement of each trough L, a chain or cord L' is attached to it, and this chain passes over guide-pulleys $L^2$, at each side of the machine and around a large wheel $L^3$, by which it is driven and which is fast on a central shaft $L^4$, extending throughout the whole length of the machine. The central shaft $L^4$ is driven through a pinion $L^5$, Fig. 7, a rack-toothed bar $L^6$, spur-wheels $L^7$, pinions $L^8$, a shaft $L^9$, and spur-wheels M $H^3$ H', from the first-motion shaft H. The traverse of a trough L consists of a movement from one side of the machine to the other and back again, and to effect this reciprocation the rack $L^6$ is provided. The rack $L^6$, Figs. 7, 8, 9, and 10, moves in guides N and is formed with a part N', having a cam-shaped slot in it, in which works a pin $N^2$, encircled by an antifriction-sleeve $N^3$, this pin being fixed to and between two spur-wheels $L^7$, which when they revolve cause the rack to reciprocate and with it the trough L. The shape of the cam-slot is such as to make the bar $L^6$ reciprocate only at the proper time—that is, when the fabric is stationary and the stencil-trays are lowered. Any granular material getting to the outer sides of the trough L is pushed over the stencil-trays to either side of the machine and falls down chutes F to receptacles (not shown) provided to receive it.

All of the variously-colored portions of linoleum material supplied through the stencil-plates may in the case of each tray K and trough L fall on the backing fabric and occupy the full intended thickness of the linoleum material; but for some goods the fabric may be completely covered with some of the colors, while additional dark or other small outline or other markings or shadings may be produced on the main or body colors of the pattern details by means of another stencil-tray P and trough Q, (or it might be more than one,) actuated similarly to the trays and troughs L supplying the body colors and arranged to apply comparatively small quantities of suitably-colored material upon the surfaces of the previously-supplied material. Before applying the outline or other markings or shadings the material already in place is preferably made level and receives a certain amount of pressure by means of boards or plates R. Such plates R are moved by vertical rods K' and other parts similar to the corresponding parts used in connection with the stencil-trays, so as to rise while the fabric moves and drop while the fabric is stationary, and they may be provided with projections to form indentations to receive the subsequently-added marking or shading material.

Each portion of the fabric after receiving in successive steps the variously-colored portions of the linoleum material proceeds through a chamber in which it is heated by means of steam-pipes S and jackets or chests T, or in any other convenient way. The steam-pipes S are supported on the framing A' in such a manner as to be above the fabric, while the jackets or chests T form part of the table or framing and are consequently below the fabric. The steam-pipes S are inclosed by a metal plate S', partly forming the heating-chamber. From the heating-chamber the fabric passes into an hydraulic press V, wherein it is subjected to a considerable pressure, the ram and platen V' being preferably arranged to press upward. The part $V^2$ comprises the press-head, and the hydraulic cylinder or cylinders and parts immediately in connection therewith are not shown, being sunk into the ground below the machine. The valves for the hydraulic cylinders are operated in any known suitable way from the shaft $G^2$, through which the forward motion of the fabric takes place. To prevent adherence, the press-head $V^2$ may be provided with a suitable bearing-surface, such as a polished surface of metal—as, for example, nickel-plated or copper-plated cast-iron or other metal; but it is preferable to interpose between the press-head $V^2$ and the linoleum fabric two cloths $V^8$ (or it might be one only) of suitable material saturated or treated with a non-adherent substance, such as wax composition.

The separating-cloths $V^3$ are moved step by step with the linoleum fabric, and on leaving the press V pass onto rollers $V^4$, so as to become separated from the linoleum fabric. The step-by-step motion is imparted to the separating-cloths $V^3$ by belting acting on pulleys on the spindles $V^5$ of the rollers $V^4$ and on a pulley $V^6$ on a guide-roller shaft $V^7$, this shaft being turned by the fabric moving around the guide-roller $V^8$, fast on it. The take-up-cylinder shaft $D^5$ has a pulley W, fast on it, from which a belt imparts the step-by-step motion to the drum $D^2$, on which the fabric is wound by means of another pulley W', fast on the drum-shaft $W^2$.

To further insure accuracy in the step-by-step movements of the fabric and to prevent rebound of any of the parts at the end of each forward movement, each of one or more of the levers or moving parts is connected to the piston of an air-cylinder (not shown) fitted with check-valves arranged for drawing in air during each stroke, so as to confine it and obstruct the rebound of the piston.

What I claim as my invention is—

1. In machinery for producing patterned linoleum floor-cloth with granulated linoleum applied through stencil-plates, the combination comprising means for moving the woven fabric or backing step by step, a longitudinal series of stencil-plates which are stationary at a distance above the backing equal to the thickness of granulated linoleum to be deposited while it is being deposited but are raised during each forward movement of the backing, longitudinal open-bottom troughs to distribute the granulated linoleum over the stencil-plates, means to move the troughs transversely from side to side and back again between the forward movements of the backing, means for heating the linoleum deposited on the backing, and means for subjecting the heated linoleum on the backing to great pressure, all substantially as herein set forth.

2. In machinery for producing patterned linoleum floor-cloth, &c., apparatus for distributing granulated linoleum through a stencil-plate, and consisting of an open-bottomed trough placed longitudinally but made to move from side to side, combined with means to move the trough from side to side and a stencil-plate tray made with outlets at the sides for the discharge of linoleum caught on the outsides of the trough, substantially as herein set forth.

3. In a machine for making linoleum, the combination with distributing-troughs, of mechanism for moving the distributing-troughs, and consisting of chains or cords attached to the troughs, a longitudinal shaft, carrying pulleys or drums placed below the table of the machine, and guide-pulleys over which the chains or cords pass, in combination with a cam-slotted lever to impart a reciprocating motion to the said shaft and a continuously-rotating shaft having a crank-pin to act on the slotted lever, substantially as herein set forth.

4. In machinery for producing patterned linoleum floor-cloth, the combination of two or more stencil-plates through which granulated linoleum of different ground or body colors is distributed, such stencil-plates being cut so as to cause the woven fabric or backing to be completely covered with the said ground or body colors, with one or more additional stencil-plates to deposit linoleum to produce outline, shading, or other markings upon the surface of the previously-deposited ground or body colors, substantially as herein set forth.

5. In machinery for producing patterned linoleum floor-cloth with granulated linoleum applied through stencil-plates, the combination comprising means for moving the fabric or backing step by step, a series of stencil-plates adapted to be held stationary at a distance above the backing equal to the thickness of the granulated linoleum to be deposited, while it is being deposited, means for raising such plates during each forward movement of the backing, and transversely-movable open-bottom troughs to distribute the granulated linoleum over the stencil-plates, substantially as set forth.

6. In machinery for producing patterned linoleum floor-cloth with granulated linoleum applied through stencil-plates, the combination comprising means for moving the fabric or backing step by step, a series of stencil-plates adapted to be held stationary at a distance above the backing equal to the thickness of the granulated linoleum to be deposited, while it is being deposited, means for raising such plates during each forward movement of the backing, transversely-movable open-bottom troughs to distribute the granulated linoleum over the stencil-plates, means for heating the linoleum deposited on the backing, and means for subjecting the heated linoleum on the backing to great pressure.

In testimony whereof I have signed my name to this specification in the presence of two subscribing witnesses.

MICHAEL BARKER NAIRN.

Witnesses:
JOHN TOD,
WILLIAM BLACKSTOCK.